Figure 9:
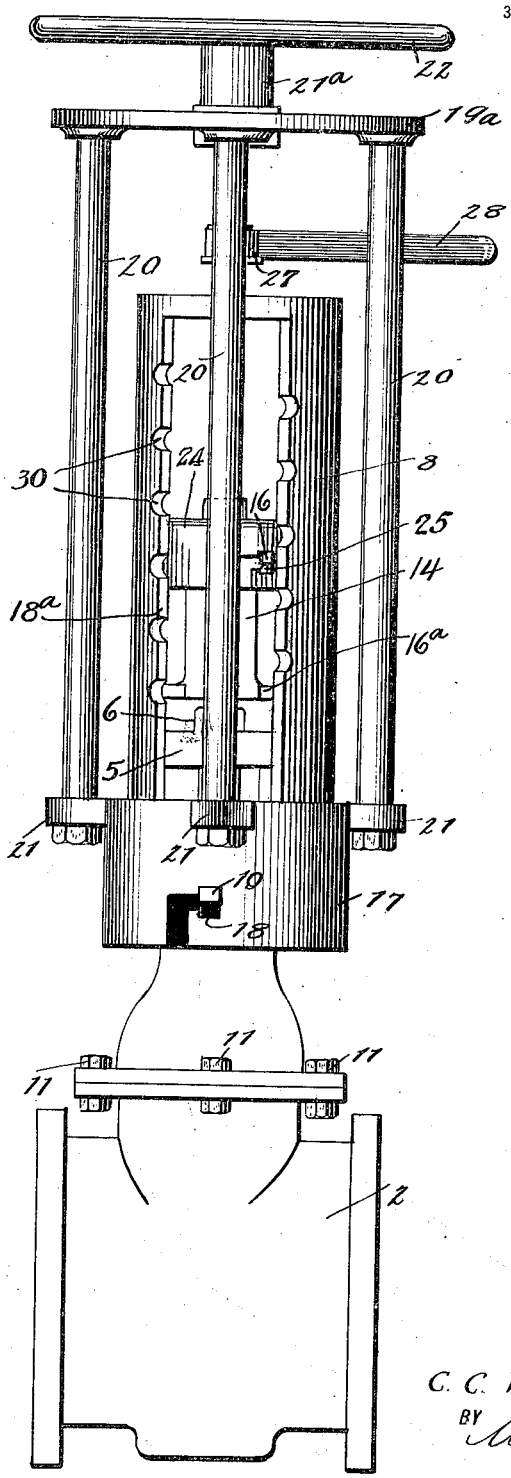

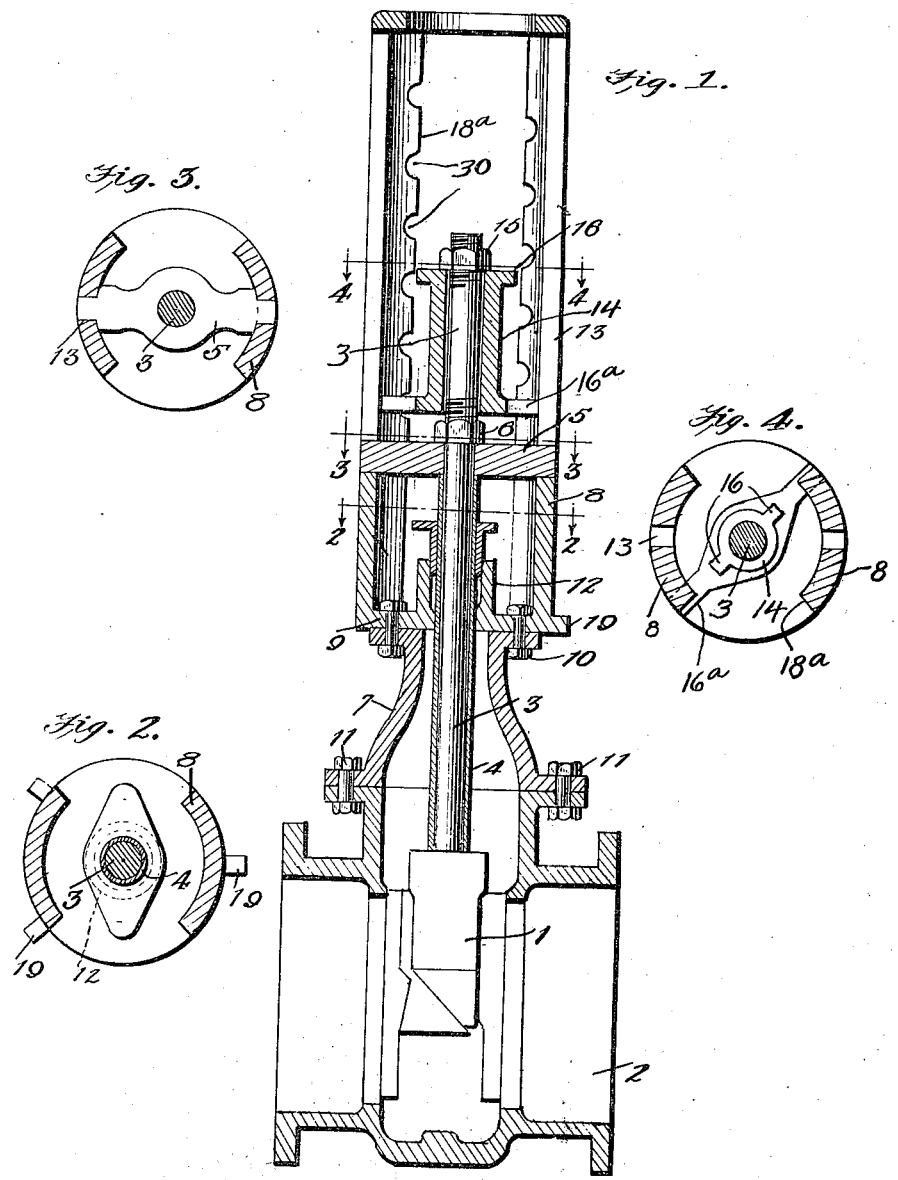

C. C. WILLIAMS.
VALVE.
APPLICATION FILED APR. 9, 1920.
1,438,203.
Patented Dec. 12, 1922.
3 SHEETS—SHEET 2.
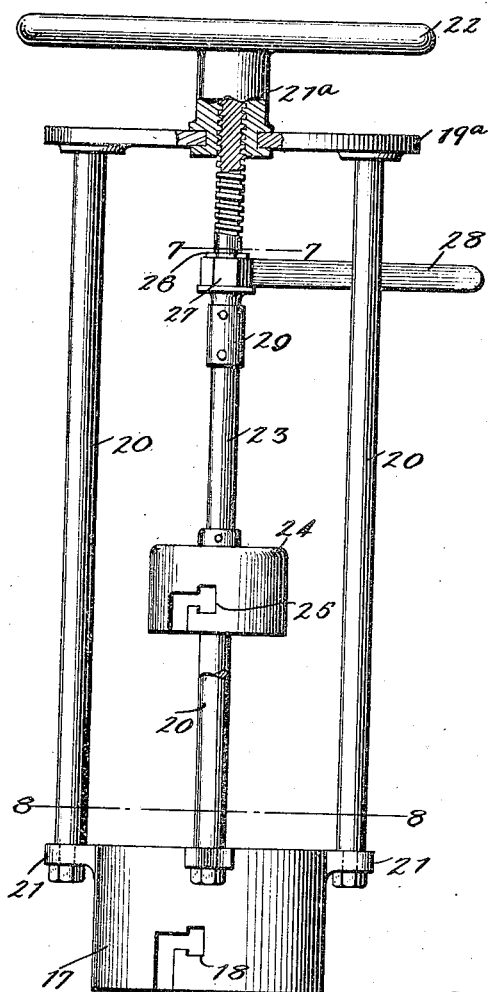
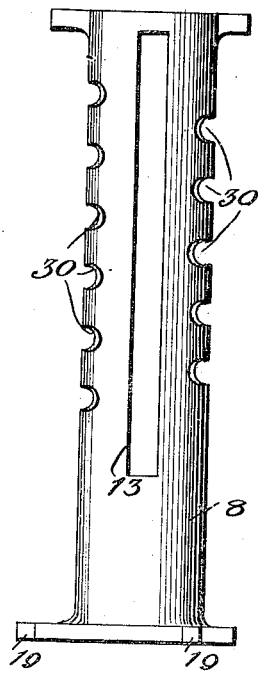
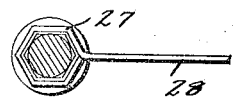
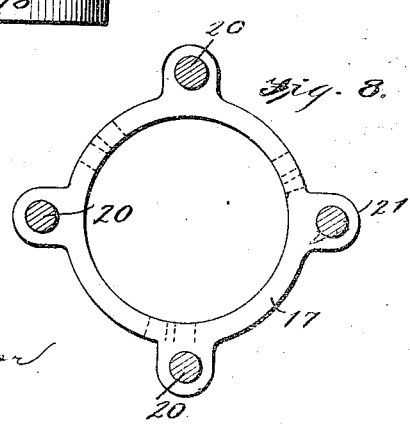
WITNESSES
INVENTOR
C. C. WILLIAMS,
BY
ATTORNEYS

C. C. WILLIAMS.
VALVE.
APPLICATION FILED APR. 9, 1920.

1,438,203.

Patented Dec. 12, 1922
3 SHEETS—SHEET 3.

WITNESSES

INVENTOR
C. C. WILLIAMS,
BY
ATTORNEYS

Patented Dec. 12, 1922.

1,438,203

UNITED STATES PATENT OFFICE.

CHESTER CLARK WILLIAMS, OF BLOOMINGTON, ILLINOIS.

VALVE.

Application filed April 9, 1920. Serial No. 372,444.

*To all whom it may concern:*

Be it known that I, CHESTER C. WILLIAMS, a citizen of the United States, and a resident of Bloomington, in the county of McLean, and State of Illinois, have invented certain new and useful Improvements in Valves, of which the following is a specification.

My invention is an improvement in valves, and has for its object to provide a valve especially adapted for use as a gate valve in water supply systems, and the like, wherein the stem of the valve is subject to corrosion and to the collection of incrustations, and to provide a means for opening and closing the valve by moving the stem longitudinally without any turning movement, which is liable to twist off the stem, the said means being detachable at will, to permit it to be used with a number of valves.

In the drawings:

Figure 1 is a sectional view showing the valve,

Figures 2, 3 and 4 are sections on the lines 2—2, 3—3, and 4—4, respectively of Figure 1, Figure 5 is a side view of the guide for the stem at right angles to Figure 1, Figure 6 is a front view of the means for operating the valve, Figures 7 and 8 are sections on the lines 7—7 and 8—8, respectively of Figure 6.

Figure 9 is a front view of the valve.

In the present embodiment of the invention, the valve 1 is a gate valve, moving transversely of the casing 2 in which it is arranged, and the valve has a stem 3 which is encircled by a sleeve 4 of brass, the said sleeve being arranged between the valve and a cross head 5 held on the stem by a nut 6 arranged above the cross head, and clamping the cross head between the nut and the sleeve.

A reduced union or bonnet 7 is arranged between the valve casing 2 and the guide for the stem, which consists of a substantially cylindrical casing or valve stem guide 8 having its inner end closed as indicated at 9, and this closed inner end is connected to the outer end of the reduced union by bolts and nuts 10, the reducing union being connected to the casing by similar bolts and nuts 11.

The sleeve passes through the closed inner end of the casing through a stuffing box 12 provided with the usual packing and gland, as shown, and the ends of the cross head 5 move in oppositely arranged slots 13 in the casing 8, said slots being diametrically opposite and extending vertically or longitudinally of the casing or valve stem guide. A hub or sleeve 14 is loosely held on the outer end of the stem, and above the cross head, between the lock nut 6 and a lock nut 15, and this sleeve has at its outer end oppositely extending lugs 16$^a$ for a purpose to be presently described. In order to open the valve with the above arrangement, the stem is pulled directly outward, and to close the valve, the stem is pushed inward.

The casing or valve stem guide 8 is provided with spaced diametrically opposed peripheral walls having longitudinal slots or openings 13 in which the ends of the cross head 5 are engaged, the cross head being in this manner constrained to rotate with the stem but adapted to shift vertically therewith. The lower end of the hub or sleeve 14 opposed to that provided with oppositely extending lugs 16 is provided with a cross arm or stem lug and lock 16$^a$, the ends of which are disposed to engage and move in limited arcs described by the openings 18$^a$ disposed diametrically opposite or between the walls provided with the slots 13 and the opposed edges of said walls are provided with notches 30 each of an arc of a circle greater than 180° so as to form seats for the ends of the arm 16$^a$ which is disposed at an angle of 45° from the position of the cross head 5, as clearly shown in Figures 3 and 4 of the drawings, so as to bisect the angles produced by lines passing through the centers of the slots 13 and the openings 18$^a$ arranged at right angles thereto. It will be obvious that the cross arm 16$^a$ will engage in diametrically opposed notches in opposed pairs of edges of the respective walls of the casing or valve stem guide 8 provided with the notches so as to constrain the same and thus the hub or sleeve 14 from turning in one direction or the other, depending upon the direction in which the stem 3 is turned for opening or closing the valve or gate, thus providing means for locking the valve in a set position, closed or open as desired. The notches 30 are also preferably arranged in staggered relation so as to increase the number of adjustments and the refinement with which such adjustments may be made in opening the valve and locking it in the desired position.

Independent mechanism shown in Figures 6, 7 and 8 is provided for opening the valves. This mechanism comprises a sleeve or collar 17 which has bayonet slots 18 extending from its lower edge, and these bayonet slots are adapted to engage radial lugs 19 on the lower end of the casing 8, to lock the sleeve or collar to the casing 8. A plate 19ª is connected to the collar by means of rods 20, the rods being integral with the plate, and passing through radial lugs 21 on the adjacent end of the collar, and the plate 19ª has a central opening in which is journaled a nut 21ª, the nut having a hand wheel 22 rigid therewith. This nut is held in the plate 19 in such manner that while freely rotatable, it cannot move longitudinally of the supporting frame composed of the collar 17, the plate 19ª and the rods 20.

An auxiliary stem 23 is arranged in the support, the said stem having its outer end threaded for engaging the nut 21ª, and at its inner end this stem is provided with a cap 24 having in its lower edges bayonet slots 25. These bayonet slots are adapted to engage the lug 16 on the sleeve 14, to lock the screw threaded auxiliary stem to the stem of the valve.

At the inner end of the screw threaded portion of the auxiliary stem, the said stem is provided with a polygonal portion 26 of greater cross section than the stem, and this polygonal portion is adapted to be engaged by a similarly shaped socket 27 of a wrench 28. The purpose of the wrench 28 in engagement with the polygonal or wrench engaging portion 26 through the medium of the socket 27 is to permit the auxiliary stem 23 to be oscillated or partially rotated in order to turn the cross arm 16ª for the purpose of disengaging the ends thereof from the notches 30 in order that the valves may be shifted upon turning the operating wheel or handle 22, the formation of the notches normally preventing accidental displacement of the ends of the cross arm therefrom. When the valve is adjusted the handle or wrench 28 is then employed for the purpose of moving the ends of the cross arm into engagement with the notches so that the valve or gate is again locked in position and against movement. The socket fits loosely over the polygonal portion, so that it may be disengaged from the said portion by moving the wrench upward so that the stem 23 may be free to rotate without swinging the wrench or handle 28, since if the wrench or handle 28 were held against movement, the stem would not turn except in a limited arc described by the connecting rod 20 between which the wrench extends. Preferably the screw threaded portion of the auxiliary stem is connected to the body thereof by a sleeve 29, which is connected to both sections.

In the operation of the device, when it is desired to open the valve, the collar 17 is first connected with the casing 8, by engaging the lugs 19 with the bayonet slots 18. It will be noticed that these slots as also the slots 25, are enlarged at their inner ends, so that the lugs 19 or 16 as the case may be, may be locked in the slots. After the collar 17 has been engaged with the casing 8, the cap 24 of the auxiliary stem is engaged with the sleeve 14, by inserting the lug 16 in the bayonet slots. This locking of the cap 24 is preferably done by means of the wrench 28. After the cap 24 is engaged with the sleeve 14, it will be evident that the turn of the wheel 22 in the opposite direction will move the valve stem longitudinally to open the gate. After the gate is opened, it is locked in open position, by engaging the ends of the cross arm 16ª with notches 30 in the edges of the walls provided with the slots 13 and at the opposite sides of the openings 18ª. These openings are so arranged that the ends of the cross head may be engaged with the series of notches at either edge.

I claim:

1. In combination with a gate valve having a stem, of a mounting for the stem comprising a frame having slotted side members, the stem having a cross head engaging the side members at its ends, said stem having mounted thereon a sleeve provided at each end with pairs of oppositely extending lugs, the side members having notches for engagement by the lugs at the inner end, and means capable of being detachably connected to the guide and to the lugs at the outer end of the sleeve for gradually drawing the stem outward to open the valve, said means comprising a frame having at its inner end a sleeve fitting over the guide and provided with bayonet slots, the guide having lugs for engaging the slots, a nut supported by the outer end of the frame, a rod threaded through the nut and having at its inner end a cup-shaped member provided with bayonet slots for engagement by the lugs at the outer end of the sleeve, and means for rotating the nut.

2. In combination with a gate valve having a stem, of a mounting for the stem comprising a frame having slotted side members, the stem having a cross head engaging the side members at its ends, said stem having mounted thereon a sleeve provided at each end with pairs of oppositely extending lugs, the side members having notches for engagement by the lugs at the inner end, and means capable of being detachably connected to the guide and to the lugs at the outer end of the sleeve for gradually drawing the stem outward to open the valve, said means comprising a frame having at its inner end a sleeve fitting over the guide and provided with bayonet slots, the guide having lugs for engaging the slots, a nut journaled on the support and having means for rotating the same, and a rod threaded through the nut and having means for engaging the lugs of the sleeve.

3. In combination with a gate valve having a stem, of a mounting for the stem comprising a frame having slotted side members, the stem having a cross head engaging the side members at its ends, said stem having mounted thereon a sleeve provided at each end with pairs of oppositely extending lugs, the side members having notches for engagement by the lugs at the inner end, and means capable of being detachably connected to the guide and to the lugs at the outer end of the sleeve for gradually drawing the stem outward to open the valve, said means comprising a frame having at its inner end a sleeve fitting over the guide and provided with bayonet slots, the guide having lugs for engaging the slots.

4. In combination with a gate valve having a stem, of a mounting for the stem comprising a frame having slotted side members, the stem having a cross head engaging the side members at its ends, said stem having mounted thereon a sleeve provided at each end with pairs of oppositely extending lugs, the side members having notches for engagement by the lugs at the inner end, and means capable of being detachably connected to the guide and to the lugs at the outer end of the sleeve for gradually drawing the stem outward to open the valve.

5. In combination with a gate valve having a stem, of a frame, means for operating the valve comprising elements movable with respect to each other, one of said elements having means for detachably engaging the frame and the other having means for detachably engaging the stem, and a threaded connection between the said elements, said connection comprising a nut journaled in one of the elements and a rod threaded through the nut and carrying the means for engaging the stem, said last named means comprising a cup-shaped member having bayonet slots, and a sleeve journaled on the stem and having lugs for engaging the slots.

6. In combination with a gate valve having a stem, of a frame, means for operating the valve comprising elements movable with respect to each other, one of said elements having means for detachably engaging the frame and the other having means for detachably engaging the stem, and a threaded connection between the said elements, said connection comprising a nut journaled in one of the elements and a rod threaded through the nut and carrying the means for engaging the stem.

7. The combination with a gate valve having a stem; of a frame slidably connected with the same, means for operating the valve comprising elements movable with respect to each other, one of said elements having means for detachably engaging the frame and the other having means for detachably engaging the stem, and a threaded connection between said elements, said operating means being carried by the frame.

8. In combination with a gate valve having a stem, of a frame slidably connected with the stem, and operating means for moving the stem longitudinally, said operating means consisting of a supporting frame including an element having means for detachably engaging the first named frame, an element having means for detachably and rotatably engaging the stem, a nut rotatably supported upon said second named frame and a rod connected with the stem engaging element and threaded through the nut.

9. In combination with a gate valve having a stem, of a mounting for the stem comprising a frame having slotted side members, a cross head carried by the stem and engaging the slots of said side members, means cooperating between said stem and the frame for holding the stem against longitudinal movement at different elevations, and means for engaging the stem and the frame to hold the latter while opening or closing the valve.

10. In combination with a gate valve having a stem, of a mounting for the stem comprising a frame having slotted side members, a cross head carried by the stem and engaging the slots of said side members, a sleeve rotatably receiving the stem, said frame having openings provided with notches in diamatrically opposed edges registering with each other, said notches being disposed in stepped relation, said sleeve having lugs engaging said notches to hold the stem against movement in an adjusted position, and means for turning the sleeve to engage or disengage the lugs with respect to the notches.

11. In combination with a gate valve having a stem, of a mounting for the stem comprising a frame having slotted side members, a cross head carried by the stem and engaging the slots of said side members, a sleeve rotatably receiving the stem, said frame having openings provided with notches in diametrically opposed edges registering with each other, said notches being disposed in stepped relation, said sleeve having lugs engaging said notches to hold the stem against movement in an adjusted position, a handle having means to engage the stem and sleeve for moving the lug into and out of locking position with respect to the notches, and means for adjusting the stem longitudinally independently of the last named means.

12. The combination with a gate valve or the like having a casing and a bonnet; of a valve stem guide connected to the bonnet and provided with a radial lugs, said guide having opposed slots, a stem projecting upwardly from the gate of the valve through the bonnet and guide, a packing joint between the stem and the guide, a cross head loose on the stem and having reduced end portions forming shoulders, said reduced ends being engaged with the slots and the shoulders with the inner faces of the walls of the guide adjacent the slots, said cross head being adapted to slide longitudinally in said slots, said guide having opposed openings provided with notches in the opposite ends thereof, the notches of diametrically opposite edges being in alignment horizontally of the guide, means for retaining the cross head in position, a hub rotatable on the stem, means for retaining said hub in position against longitudinally displacement, said hub having upper and lower lugs, the lower lugs extending into the openings for engagement with opposed aligned notches, a frame for engaging the lugs of the guide and means carried by the frame for engaging the lugs of the hub and upon actuation for shifting the stem longitudinally.

13. The combination with a gate valve or the like having a casing and a bonnet; of a valve stem guide connected to the bonnet and provided with radial lugs, said guide having opposed slots, a stem projecting upwardly from the gate of the valve through the bonnet and guide, a packing joint between the stem and the guide, a cross head loose on the stem and having reduced end portions forming shoulders, said reduced ends being engaged with the slots and the shoulders with the inner faces of the walls of the guide adjacent the slots, said cross head being connected to slide longitudinally in said slots, said guide having opposed openings provided with notches in the opposite sides thereof, the notches of diametrically opposite edges being in alignment transversely of the guide, means for retaining the cross head in position, a hub rotatable on the stem, means for retaining said hub in position against longitudinal displacement, said hub having upper and lower lugs, the lower lugs extending into the openings for engagement with opposed aligned notches, a frame for engaging the lugs of the guide and means carried by the frame for engaging the upper lugs of the hub and upon actuation for shifting the stem longitudinally, said last mentioned means being provided with means for turning the hub into and out of operative position.

14. The combination with a gate valve or the like having a casing and a bonnet; of a valve stem guide connected to the bonnet and provided with radial lugs, said guide having opposed slots, a stem projecting upwardly from the gate of the valve through the bonnet and guide, a packing joint between the stem and the guide, a cross head loose on the stem and having reduced end portions forming shoulders, said reduced ends being engaged with the slots and the shoulders with the inner faces of the walls of the guide adjacent the slots, said cross head being connected to slide longitudinally in said slots, said guide having opposed openings provided with notches in the opposite sides thereof, the notches of diametrically opposite edges being in alignment horizontally or transversely of the guide, means for retaining the cross head in position, a hub rotatable on the stem, means for retaining said hub in position against longitudinal displacement, said hub having upper and lower lugs, the lower lugs extending into the openings for engagement with opposed aligned notches, a frame for engaging the lugs of the guide and means carried by the frame for engaging the upper lugs of the hub and upon actuating for shifting the stem longitudinally, said last mentioned means being provided with means for turning the hub into and out of operative position, 15. The combination with a gate valve or the like having a casing and a bonnet; of a valve stem guide connected to the bonnet and provided with radial lugs, said guide having opposed slots, a stem projecting upwardly from the gate of the valve through the bonnet and guide, a packing joint between the stem and the guide, a cross head loose on the stem and having reduced end portions forming shoulders, said reduced ends being engaged with the slots and the shoulders with the inner faces of the walls of the guide adjacent the slots, said cross head being connected to slide longitudinally in said slots, said guide having opposed openings provided with notches in the opposite sides thereof, the notches of diametrically opposite edges being in alignment horizontally or transversely of the guide, means for retaining the cross head in position, a hub rotatable on the stem, means for retaining said hub in position against longitudinal displacement, said hub having upper and lower lugs, the lower lugs extending into the openings for engagement with opposed aligned notches, a frame adapted to fit over the guide, said frame having bayonet slots for engagement with the lugs of the guide to hold the latter against movement, an auxiliary stem having a coupler provided with bayonet slots for engaging the lugs at the top of the hub to connect to the stem therethrough, and means carried by the top of the frame and adapted upon actuation to shift the auxiliary stem longitudinally.

16. The combination with a gate valve or the like having a casing and a bonnet; of a valve stem guide connected to the bonnet and provided with radial lugs, said guide having opposed slots, a stem projecting upwardly from the gate of the valve through the bonnet and guide, a packing joint between the stem and the guide, a cross head loose on the stem and having reduced end portions forming shoulders, said reduced ends being engaged with the slots and the shoulders with the inner faces of the walls of the guide adjacent the slots, said cross head being connected to slide longitudinally in said slots, said guide having opposed openings provided with notches in the opposite sides thereof, the notches of diametrically opposite edges being in alignment horizontally or transversely of the guide, means for retaining the cross head in position, a hub rotatable on the stem, means for retaining said hub in position against longitudinal displacement, said hub having upper and lower lugs, the lower lugs extending into the openings for engagement with opposed aligned notches, a frame adapted to fit over the guide, said frame having bayonet slots for engagement with the lugs of the guide to hold the latter against movement, an auxiliary stem having a coupler provided with bayonet slots for engaging the lugs at the top of the hub to connect to the stem therethrough, means carried by the top of the frame and adapted upon actuation to shift the auxiliary stem longitudinally, and a locking lever having means cooperating with the auxiliary stem to turn the latter and the hub to engage or disengage the lugs thereon with respect to the notches, said locking lever being displaceable to permit free turning of the actuating means.

17. In a gate valve, the combination with the stem thereof, a guide receiving said stem and adapted to be coupled to the casing of the valve, said guide having means cooperating with the stem to constrain the latter from rotating while permitting longitudinal displacement thereof, means cooperating between the stem and the guide to hold the stem in an adjusted position, and means for shifting the stem longitudinally.

18. In a gate valve, the combination with the stem thereof, a guide receiving said stem and adapted to be coupled to the casing of the valve, said guide having means cooperating with the stem to constrain the latter from rotating while permitting longitudinal displacement thereof, means cooperating between the stem and the guide to hold the stem in an adjusted position, said last mentioned means being adapted for the application of an operating device to shift the stem longitudinally.

19. In a gate valve, the combination with the stem thereof, a guide receiving said stem and adapted to be coupled to the casing of the valve, said guide having means cooperating with the stem to constrain the latter from rotating while permitting longitudinal displacement thereof, means cooperating between the stem and the guide to hold the stem in an adjusted position, said last mentioned means being adapted for the application of an operating device to shift the stem longitudinally, and means for supporting the last mentioned means and adapted for engagement with the guide and held against movement thereby.

20. The combination with a valve having a sliding stem, a guide for the stem connected to the valve, means for holding the stem in an adjusted position and locking it, said stem being held from rotation and adapted for longitudinal movement and means for guiding the stem during such movement; of operating mechanism comprising a frame adapted to fit over the guide and stem and having means engaging the guide, a hand operated screw carried by the frame at the top thereof, an auxilliary stem carried by the screw and coupling the auxiliary stem to the first named stem whereby the two will move together when the screw is shifted longitudinally.

CHESTER CLARK WILLIAMS.